US011867024B2

(12) United States Patent
Spencer et al.

(10) Patent No.: US 11,867,024 B2
(45) Date of Patent: Jan. 9, 2024

(54) MANIFOLD AND FLUID FLOW CONTROL

(71) Applicant: Baker Hughes Energy Technology UK Limited, Bristol (GB)

(72) Inventors: David Neil Spencer, Aberdeen (GB); Per Magne Reiten, Trondheim (NO); William Bryson, Montrose (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 0 days.

(21) Appl. No.: 17/013,961

(22) Filed: Sep. 8, 2020

(65) Prior Publication Data
US 2020/0399980 A1 Dec. 24, 2020

Related U.S. Application Data

(63) Continuation of application No. PCT/EP2019/025067, filed on Mar. 11, 2019.

(30) Foreign Application Priority Data

Mar. 9, 2018 (GB) .................................. 1803824
Nov. 27, 2018 (GB) .................................. 1819308
Mar. 6, 2019 (GB) .................................. 1902976

(51) Int. Cl.
*E21B 34/04* (2006.01)
*E21B 41/00* (2006.01)
(Continued)

(52) U.S. Cl.
CPC .......... *E21B 34/04* (2013.01); *E21B 41/0007* (2013.01); *E21B 43/013* (2013.01);
(Continued)

(58) Field of Classification Search
CPC .... E21B 34/04; E21B 33/035; E21B 41/0007; E21B 43/013; F16L 41/023
(Continued)

(56) References Cited

U.S. PATENT DOCUMENTS 4,874,008 A * 10/1989 Lawson .................. E21B 34/04
137/315.09
2017/0102085 A1 4/2017 Smith, III et al.
(Continued)

FOREIGN PATENT DOCUMENTS

EP 3 279 429 A1 2/2018
GB 2 543 159 A 4/2017

OTHER PUBLICATIONS

International Search Report of the International Searching Authority for PCT/EP2019/025067 dated Jun. 27, 2019.

*Primary Examiner* — Matthew R Buck
*Assistant Examiner* — Patrick F Lambe
(74) *Attorney, Agent, or Firm* — Hogan Lovells US LLP

(57) ABSTRACT

A rigid valve block body and a method for determining fluid flow direction are disclosed. The valve block body includes a first fluid inlet and a further fluid inlet at opposed sides of a rigid valve block body. A first fluid outlet of the valve block body and a further fluid outlet of the valve block body are disposed in a spaced apart relationship. A first V-shaped fluid communication passageway comprises two passageway portions each extending within the valve block body from a first common root region proximate to the first fluid inlet. A further V-shaped fluid communication passageway comprises two further passageway portions each extending within the valve block body away from a further common root region proximate to the further fluid port. An end region of each passageway portion of the first V-shaped fluid communication passageway meets an end region of a respective passageway portion of the further V-shaped fluid communication passageway proximate to a respective fluid outlet.

19 Claims, 17 Drawing Sheets

(51) Int. Cl.
    *E21B 43/013*     (2006.01)
    *E21B 43/017*     (2006.01)
    *E21B 33/035*     (2006.01)
    *F16L 41/02*     (2006.01)

(52) U.S. Cl.
    CPC .......... *E21B 43/017* (2013.01); *E21B 33/035* (2013.01); *F16L 41/023* (2013.01)

(58) Field of Classification Search
    USPC ....................................................... 166/344
    See application file for complete search history.

(56) References Cited

U.S. PATENT DOCUMENTS

| | | |
|---|---|---|
| 2018/0023716 A1 | 1/2018 | Smith, III et al. |
| 2018/0030796 A1 | 2/2018 | Kalia et al. |
| 2018/0187522 A1* | 7/2018 | Ceccon De Azevedo ................... E21B 43/0107 |
| 2018/0328510 A1 | 11/2018 | Smith, III et al. |
| 2019/0113146 A1 | 4/2019 | Smith, III et al. |

* cited by examiner

MANIFOLD AND FLUID FLOW CONTROL

This is a continuation of International Application PCT/EP2019/025067, with an international filing date of Mar. 11, 2019, filed by applicant, the disclosure of which is hereby incorporated by reference in its entirety.

The present invention relates to a valve block body, a subsea structure such as a manifold and a method for determining fluid flow direction at such a subsea structure. In particular, but not exclusively, the present invention relates to a rigid valve block body in which internal bores are formed to provide respective fluid communication passageways. The body includes two V-shaped fluid communication passageways which form an internal diamond-shaped configuration and by selectively controlling valves, in the fluid flow path of the fluid communication passageways, fluid flow through the valve block body can be made to follow many different possible flow paths from multiple possible inputs to multiple possible fluid outputs. Optionally, one, two, three or more valve blocks can be used together at the subsea structure in a modular configuration according to need.

Various subsea structures are known where fluid inlets are connected to pipes (which may be rigid or flexible) to receive fluid and whereby incoming fluid from such fluid inlets needs to be routed in a particular direction according to use to one or maybe more of multiple possible fluid outlets. An example of a subsea structure is a subsea manifold. A subsea manifold is thus an example of a subsea structure. A subsea manifold can be used to connect flowlines and subsea Christmas trees as part of a subsea layout to help optimise and reduce a number of risers needed to provide a fluid flow path to a surface platform. The surface platform may be a floating or fixed platform. Conventionally there are several types of manifold which are known. One particular example is a manifold required for a cluster or drill centre subsea layout. Conventionally such a manifold would have dual flowlines and manifold headers and would have an ability to allow pigging operations through the system.

Manifolds are historically designed and fabricated to the bespoke requirements of a particular application. This requires significant repeat engineering effort and results in long lead times due to a necessity to source components from a number of different sub-suppliers. On many projects manifold headers are sized to meet pipeline internal bore requirements and often require the headers to be pigged to maintain the bores in a satisfactory and fully functioning condition. The size and bore of such headers is often driven by project pipeline requirements and can be dictated conventionally by a selected pipeline design. As a result it is difficult to pre-engineer headers in advance of a project so that a supplier can only propose their standard configurations to an end user.

It has been suggested to incorporate headers into a block of material. Whilst in practice this provides some advantages it can significantly add cost and weight to a manifold. This is particularly the case if consideration is given to a minimum bend requirement imposed by any pigging requirements. Consideration also has to be given to any specific header valve selection criterion including valve size, pressure rating, application design codes and sub-suppliers' design features which would dictate a design and final configuration of such headers. As a result the need to address such requirements can significantly add to engineering activities of any particular project.

Another problem associated with certain conventional manifold designs and structures is that for some designs significant numbers of weld points are required to connect various inlets and outlets together in hand with any headers. This can be a time consuming and thus costly process and the weld points can lead to failure points in use.

Certain conventional manifolds require many outlets and lack versatility in selectively connecting multiple inputs to those possible outlets.

Certain conventional manifold structures suffer from the problem that they can physically be significantly heavy items which makes them difficult to manoeuvre to a desired location and then lower to a seabed location.

It is an aim of the present invention to at least partly mitigate one or more of the above-mentioned problems.

It is an aim of certain embodiments of the present invention to provide a compact and modular manifold scheme using modular block branch assemblies which can be used to control and/or condition and/or distribute flow of fluids to/from subsea Christmas trees to a host facility via one or more of dedicated headers and flowlines.

It is an aim of certain embodiments of the present invention to provide a valve block body in the form of a rigid body which includes fluid inlets and fluid outlets and internal fluid communication passageways.

It is an aim of certain embodiments of the present invention to provide a method for determining fluid flow direction at a subsea structure.

It is an aim of certain embodiments of the present invention to provide a subsea structure for selectively connecting a plurality of inlet fluid flowlines to at least one outlet fluid flowline.

According to a first aspect of the present invention there is provided rigid valve block body for determining fluid flow direction at a subsea structure, comprising a first fluid inlet and a further fluid inlet at opposed sides of a rigid valve block body; a first fluid outlet of the valve block body and a further fluid outlet of the valve block body disposed in a spaced apart relationship; a first V-shaped fluid communication passageway that comprises two passageway portions each extending within the valve block body from a first common root region proximate to the first fluid inlet; and a further V-shaped fluid communication passageway that comprises two further passageway portions each extending within the valve block body away from a further common root region proximate to the further fluid port; wherein an end region of each passageway portion of the first V-shaped fluid communication passageway meets an end region of a respective passageway portion of the further V-shaped fluid communication passageway proximate to a respective fluid outlet.

Aptly the valve block body comprises a respective selection valve chamber, in a fluid flow path in each passageway portion, for a respective flow selection valve.

Aptly the valve block body further comprises a still further fluid outlet in a base region of the valve block body.

Aptly the valve block body comprises at least one arm region, that each extend from a side of the block body, and that comprises an inlet passageway portion that extends through the arm region from an opening orifice on the respective side.

Aptly the valve block body further comprises a respective isolation valve chamber, in a fluid flow path in each inlet passageway portion in each arm region, for a respective well isolation valve.

Aptly the valve block body further comprises a first intervention port and a further intervention port each extending from a respective opening orifice in an outer surface of the valve block body to a respective inlet passageway portion of a respective arm region via an intervention valve chamber, for a respective intervention valve.

Aptly the valve block body comprises at least one opening orifice on each respective side of the block body, each opening orifice comprising a respective fluid inlet of the valve block body, and a plurality of securing elements on the side around the opening orifice for securing to a respective inlet connection block that comprises an inlet passageway portion.

Aptly the valve block body further comprises a respective isolation valve chamber, in a fluid flow path in each inlet passageway portion in each inlet connection block, for a respective well isolation valve.

Aptly the end regions of each passageway portion meet and open into corresponding end regions of other passageway portions at an exit chamber region in the valve block body and each exit chamber region is proximate to a respective fluid outlet.

Aptly the valve block body comprises two fluid inlets and two fluid outlets.

Aptly the valve block body comprises four fluid inlets and three fluid outlets including one outlet disposed in a centre region of a base of the valve block body.

Aptly the valve block body comprises six fluid inlets and four fluid outlets including two fluid outlets disposed at respective off-centre locations in a base region of the valve block body.

Aptly the valve block body is a forged metallic body and optionally any bend in each flow path through the body is more than 120° and less than 170° inclined with respect to an incoming fluid flow path axis.

Accordingly to a second aspect of the present invention there is provided a subsea structure for connecting a plurality of inlet fluid flow lines to at least one outlet fluid flow line, comprising a rigid valve block body comprising a first fluid inlet and a further fluid inlet, a first fluid outlet and a further fluid outlet, a first V-shaped fluid communication passageway and a further V-shaped fluid communication passageway wherein an end region of each passageway portion of the first V-shaped fluid communication passageway meet an end region of a respective passageway portion of the further V-shaped fluid communication passageway proximate to a respect fluid outlet; a plurality of flow selection valves each at least partially located in a respect selection valve chamber of the valve block body; and a plurality of well isolation valves each at least partially in a respect isolation chamber of the valve block body.

Aptly the subsea structure further comprises a plurality of inlet connection blocks secured over respective fluid inlets of the valve block body, each comprising a respective isolation valve chamber, and an isolation valve at least partially in an isolation valve chamber.

Aptly the subsea structure is a subsea manifold.

Aptly the subsea structure comprises a plurality of headers external to the valve block body and in selective fluid communication with the first and further fluid outlets.

According to a third aspect of the present invention there is provided a method for determining fluid flow direction at a subsea structure, comprising the steps of providing an incoming flow of fluid to at least one fluid inlet of a plurality of fluid inlets of a valve block body and selecting a state of an isolation valve in a flow path of each of two respective passageway portions of at least one V-shaped fluid communication passageway of at least two V-shaped fluid communication passageways in the valve block body thereby directing the incoming flow of fluid from the at least one fluid inlet to a selected one of at least two fluid outlets of the valve block body.

Aptly the method further comprises simultaneously providing an incoming flow of fluid at a plurality of the fluid inlets via a selected state of the isolation valves in the V-shaped fluid communication passageways, routing the incoming flow along a plurality of passageway portions to a common outlet thereby mingling fluid from a plurality of sources or to separate fluid outlets thereby keeping fluid from a plurality of sources separate as the fluid flows through the valve block body.

Aptly the method further comprises providing fluid to a plurality of headers that are external to the valve block body by routing fluid from flow lines to the headers via at least one valve block body.

Certain embodiments of the present invention provide a valve block body which includes internal fluid communication passageways that can be used to connect multiple fluid inlets with one or more selected fluid outlets according to desire. This enables a fluid flow direction to be determined at a subsea structure that includes the valve block body.

Certain embodiments of the present invention provide a subsea structure, such as a manifold or the like, which can be utilised for connecting multiple inlet fluid flowlines to at least one outlet fluid flowline. The connection can be made selectively so that multiple possible pathways are provided that can each be selected according to choice.

Certain embodiments of the present invention provide a subsea manifold which is lighter (in terms of weight) than conventional manifolds, thereby reducing structure and foundation requirements. This makes transportation and positioning of the manifold at a desired subsea location more convenient than is possible with conventional techniques.

Certain embodiments of the present invention utilise a modular approach to the design and manufacture of subsea manifolds or other such subsea structures. By utilising multiple valve blocks and associated valves of a given/preset configuration rather than a bespoke valve block or bespoke valve blocks for a specific use, a cost associated with the provision of manifolds can be much reduced.

Certain embodiments of the present invention provide a cluster/drill centre manifold that can facilitate a direction of fluids flowing from adjacent multiple trees which are connected to the manifold via jumpers. This helps provide the flexibility to co-mingle and/or segregate wells when required. It also allows the re-use of previous exploration wells. It is also possible to accommodate other requirements such as chemical injection, controls, monitoring and/or test equipment systems.

Certain embodiments of the present invention provide a compact and modular manifold using modular block branch assemblies. The repeatability of block designs for manifold assembly including common mounting configurations and repeat fabrication methodologies mean that manifolds can be constructed where desired in a convenient and efficient manner.

Certain embodiments of the present invention help standardise a number of shared components with Christmas tree systems allowing for bulk sourcing discounts and the feasibility of putting stocking agreements in place. Commonality of parts also helps a customer with a need for a reduced level of spares, storage and maintenance.

Certain embodiments of the present invention thus provide standardised components and sub-assemblies that can be taken "off-the-shelf" to meet any specific requirements of any specific application. Valve blocks can be manufactured, qualified and pressure tested prior to being transported to a region of use where final assembly and installation occur. As a result branch blocks therefore become a sub-component of a cluster manifold allowing a high degree of local content assembly.

Certain embodiments of the present invention allow in-house manufacturing providing better control and repeatability of valve blocks compared to fabrication by third parties.

Certain embodiments of the present invention allow manifold branch piping & isolation valves to be combined, standardised and packaged into a common standard branch block assembly.

Certain embodiments of the present invention provide standard interfaces for headers and manifold structure.

Certain embodiments of the present invention allow spool fabrication and/or welding to be reduced, thereby simplifying the manifold assembly process.

Certain embodiments of the present invention allow a block assembly to be FAT tested prior to shipment and/or delivery of assembly of the block assembly to the fabrication site.

Certain embodiments of the present invention will now be described hereinafter, by way of example only, with reference to the accompanying drawings in which.

In the drawings like reference numerals refer to like parts.

Figure 1:
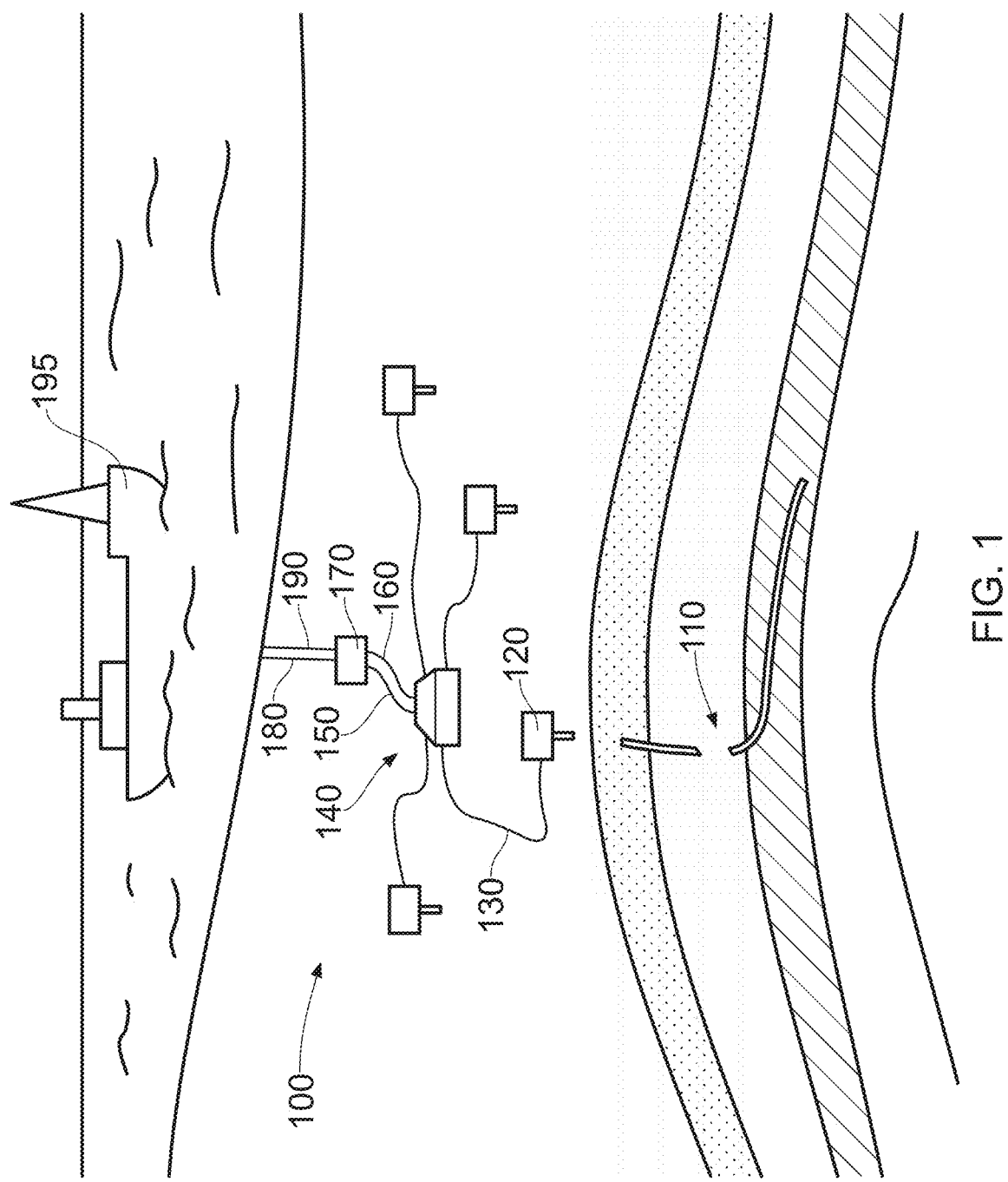
FIG. 1 illustrates a subsea structure, in the form of a compact manifold, near a completion.

FIG. 1 illustrates a subsea location 100 located above a well completion 110 that extends from a sub seabed location to the seabed and terminates in a Christmas tree 120. Four subsea Christmas trees 120 are illustrated in FIG. 1 each connected via a respective jumper 130 to a subsea manifold 140. The manifold 140 is connected via two headers 150, 160 to a lift point 170 and then via respective risers 180, 190 to a floating platform 195. Whilst FIG. 1 shows a floating platform on the surface of the sea it will be appreciated that certain embodiments of the present invention relate to subsea structures able to connect fluid flow pipes able to transport production fluids or other such fluids associated with the oil and gas industry to shore. Likewise it will be appreciated that whilst FIG. 1 illustrates a subsea manifold 140 certain embodiments of the present invention relate to the selection of fluid flow paths at many different types of subsea structure where multiple inputs should be selectively connected to one or more fluid outlets to separately allow fluid to flow from one location to another or to allow multiple input flows to comingle and thereafter flow out through a common outlet.

Figure 2:
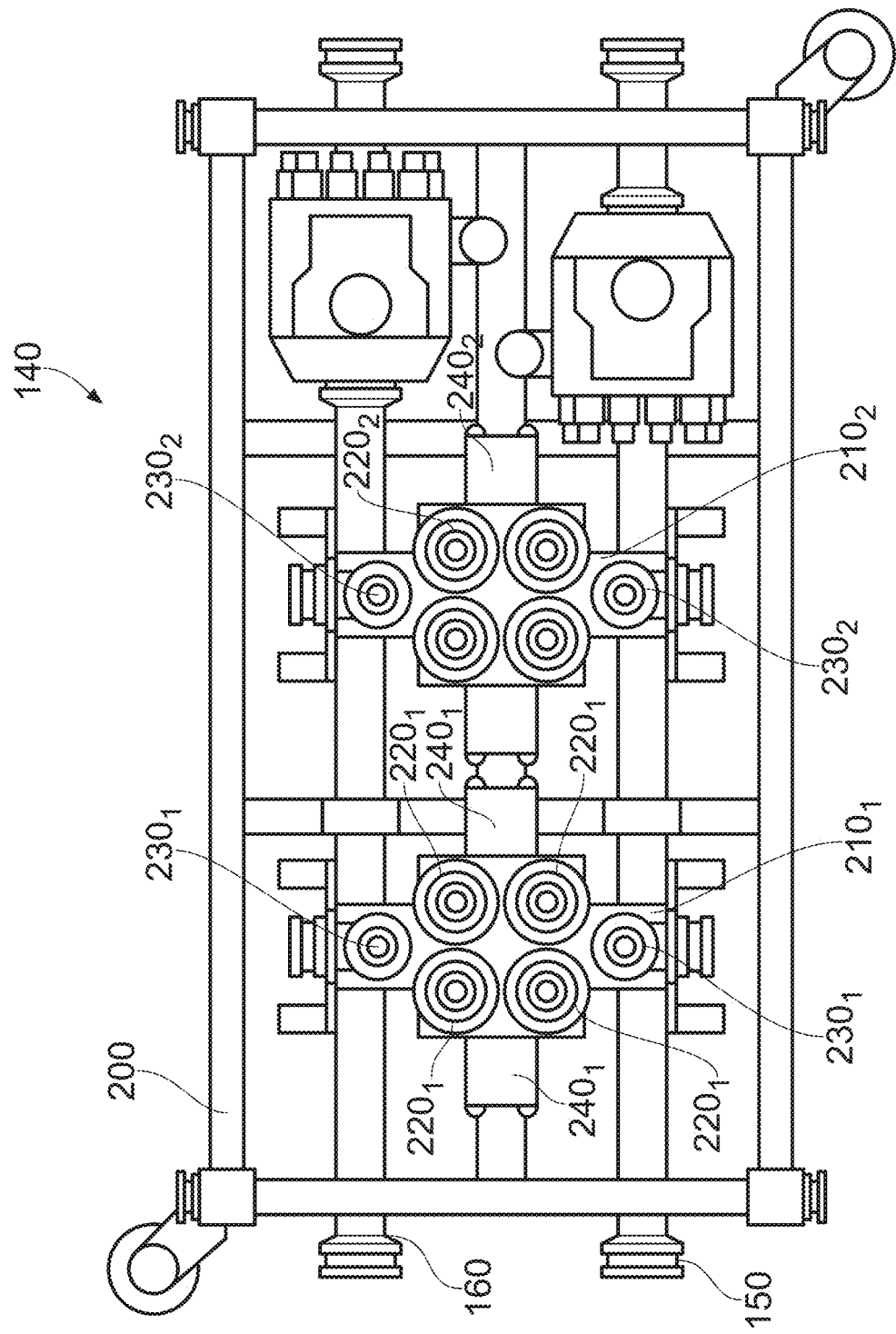
FIG. 2 illustrates a plan view of a manifold including two valve block assemblies each able to receive two inlet flows of fluid.

FIG. 2 illustrates a plan view of the manifold 140 shown in FIG. 1 in more detail. The manifold 140 includes a rigid framework 200 which supports the two headers 150, 160 in a spaced apart substantially parallel configuration. FIG. 2 also helps illustrate two rigid valve block bodies $210_{1,2}$ which are disposed in a spaced apart relationship substantially parallel across the two underlying headers. The two headers are external to the valve block bodies. Each valve block body is a rigid block of material such as a forged metallic body. This can be made from a single forging which then has internal lumens bored through it or can be 3D printed. Other manufacturing techniques and indeed other materials can of course be utilised.

FIG. 2 illustrates how four flow selector valves $220_1$ extend from the upper surface of the first valve block body $210_1$. Similarly four flow selection valves $220_2$ extend outwards (out of the page in FIG. 2) from an upper surface of the second valve block body $210_2$. FIG. 2 also helps illustrate how two inlet isolation valves $230_1$ are provided in the first (left hand side in FIG. 2) valve block body. Likewise two isolation valves $230_2$ extend from an upper surface of the right hand side (shown in FIG. 2) valve block body. Each isolation valve and each flow selector valve can be remotely controlled via respective electrical or hydraulic mechanisms to selectively open and close. Each isolation valve 230 can close to prevent fluid flowing from an inlet fluid flowline connected to a respective fluid inlet from flowing into the internal fluid communication passageways in the valve block body. Likewise each flow selection or flow selector valve can selectively close or open to allow fluid to flow along a fluid communication passageway portion provided by a bore internally within the valve block body.

FIG. 2 also illustrates how each valve block body includes two outlet blocks 240. The first valve block body 210, shown on the left hand side of FIG. 2 includes a left hand side and a right hand side (in FIG. 2) outlet block $240_1$. Likewise the right hand side (in FIG. 2) valve block $210_2$ includes a left hand side and right hand side outlet block $240_2$. These outlet blocks 240 can be securely bolted to the valve block body 210 in a selected one of four possible orientations whereby an outlet aperture in the outlet block can point downwards (into the page in FIG. 2), upwards (out of the page in FIG. 2) or left and right (up and down in FIG. 2). It will be appreciated that less than four or more than four possible orientation could be utilised if an outlet block is suitably shaped (hexagon or octagon) and provided with suitable securing elements.

Figure 3:
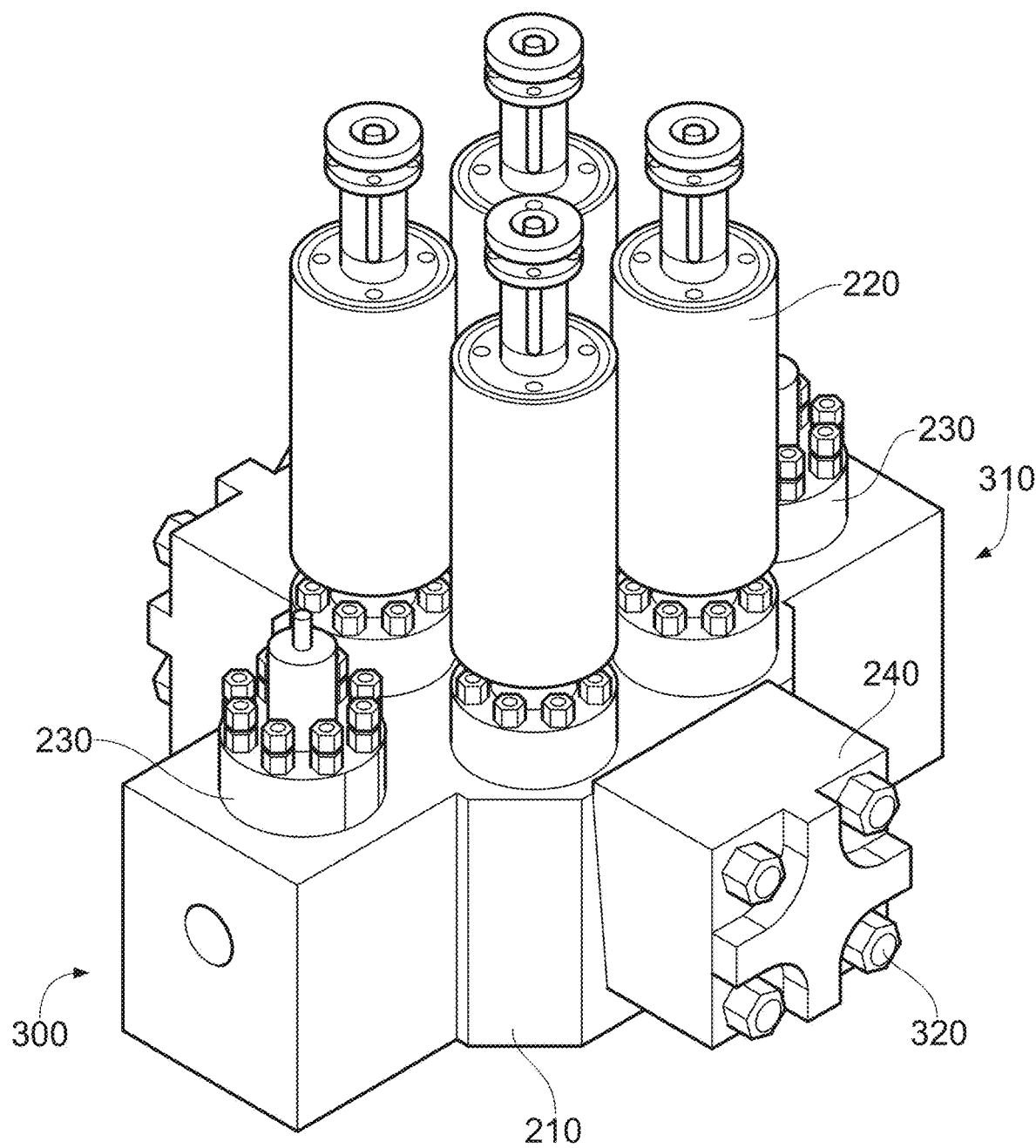
FIG. 3 illustrates a perspective view of one of the two valve blocks and associated valves shown in FIG. 2.

FIG. 3 illustrates a single rigid valve block body 210 in more detail and illustrates a first fluid inlet 300 which is an opening in an outer surface of the valve block body. A further fluid inlet 310 is illustrated at an opposed side of the rigid valve block body. FIG. 3 also helps illustrate how the outlet blocks 240 maybe secured via bolts 320 to the rigid valve block body. Other securing mechanisms could of course be utilised.

Figure 4:
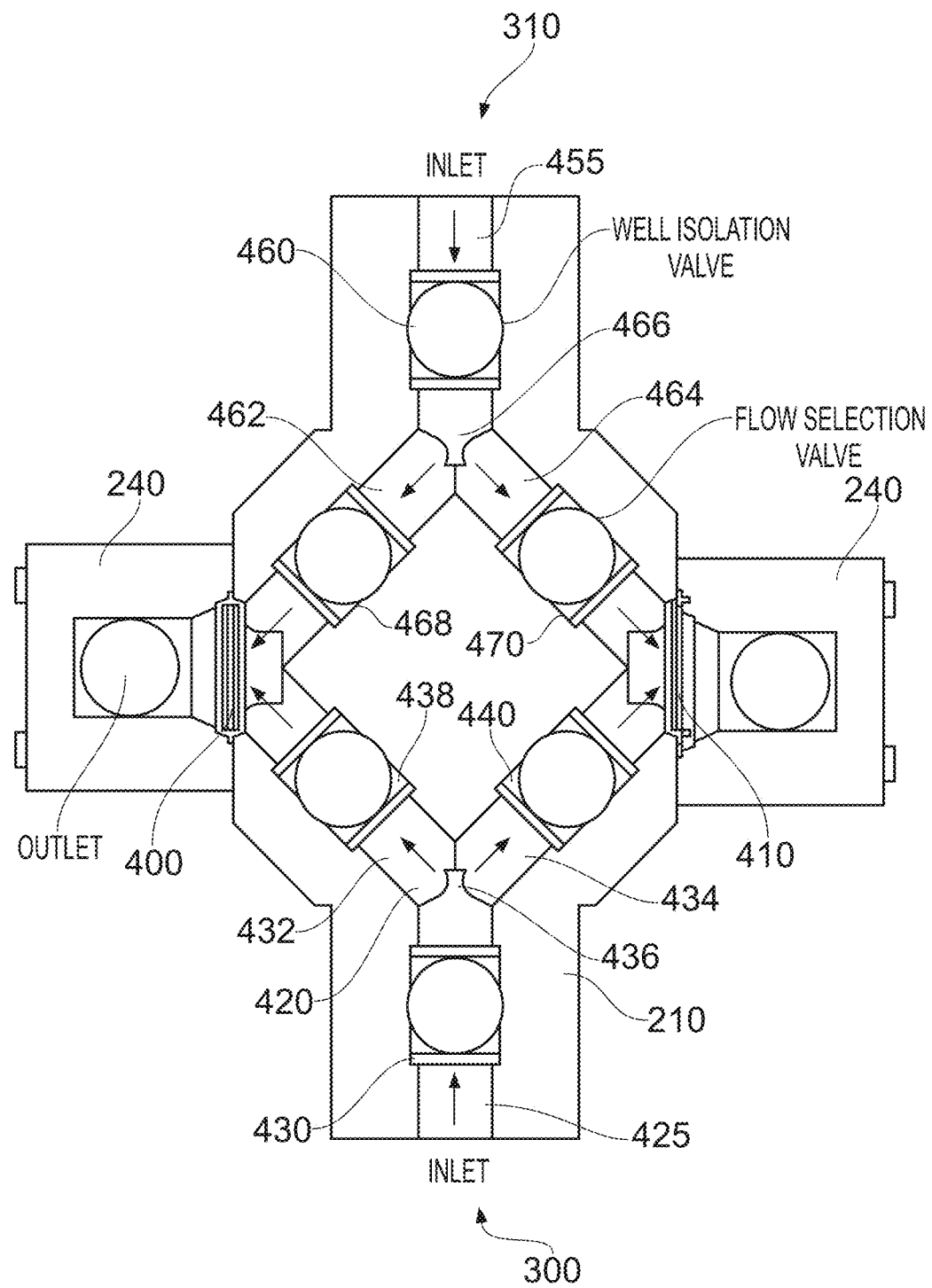
FIG. 4 illustrates fluid communication passageways in a rigid valve block body.

FIG. 4 illustrates the passageways formed internally within the rigid valve block body. FIG. 4 thus helps illustrate how the rigid valve block body 210 can be utilised to determine a flow direction at a subsea structure. The valve block body includes a first fluid inlet 300 and a further fluid inlet 310 at opposed sides of the rigid valve block body. A first fluid outlet 400 is an opening in a side of the valve block body. A further fluid outlet 410 is provided by another opening in an outer surface of the valve block body. The first and further fluid outlets are disposed in a spaced apart relationship at opposite sides of the valve block body. A first V-shaped fluid communication passageway 420 extends from a straight inlet passageway portion 425 which leads from the first fluid inlet 300 via a isolation valve chamber 430 to the meeting point where two passageway portions of the V-shaped fluid communication passageway join. That is to say the first V-shaped fluid communication passageway is formed from two passageway portions 432, 434 which meet at a first common root region 436. Fluid entering the first fluid inlet 300 passes along the straight passageway portion 425 to the root region 436. A state of a respective flow selection valve in a respective selection valve chamber 438, 440 dictates whether incoming flow of fluid from the inlet flows turns in one direction or another along a respective passageway portion 432, 434.

The further inlet 310, which is a fluid inlet at an opposed side of the rigid valve block body to the first fluid inlet 300, likewise feeds into a straight fluid communication passageway portion 455 which extends via a isolation valve chamber 460 into a root area from which a first fluid communication passageway portion 462 and a further fluid communication passageway portion 464 extend. Each of those fluid communication passageway portions 462, 464 meet at a common root region 466. A state of a flow isolation valve in the isolation valve chamber 460 determines whether fluid provided at the further inlet 310 flows into the valve block body. If fluid flow does flow into the valve block body because the isolation valve is open fluid will flow down one or both fluid communication passageway portions. Which path is followed is determined by a state of a respective flow selection valve in a respective flow selection valve chamber 468, 470.

Figure 5:
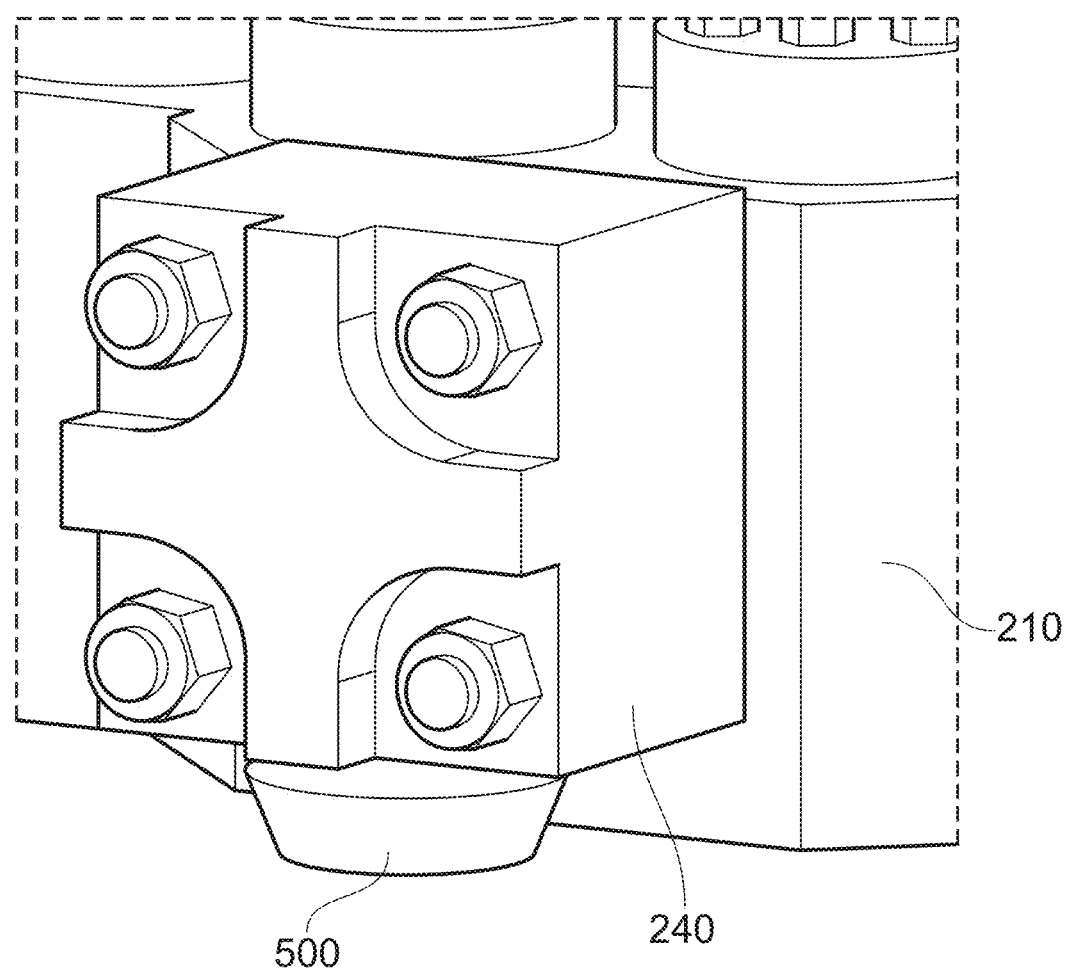
FIG. 5 illustrates a fluid outlet via an outlet block and how a direction of the outlet can be selectively re-orientated.

FIG. 4 thus illustrates how the rigid valve block body includes a first and a further V-shaped fluid communication passageway. In the rigid valve block body show in FIG. 4 the valve block body has arms which extend away from a central generally square (in plan view) region. An inlet passageway portion extends from an inlet to the root part of the V-shaped fluid communication passageway thus providing a substantially Y-shaped fluid communication passageway. As illustrated in FIG. 4 the two V-shaped passageways are opposed in the sense that the ends of the passageway portions 432, 434, 462, 464 meet close to respective outlets 400, 410. That is to say an end region of each passageway portion of the first V-shaped fluid communication passageway meets an end region of a respective passageway portion of the further V-shaped fluid communication passageway proximate to a respective fluid outlet. FIG. 4 helps illustrate how the outlets 400, 410 are each "capped" by a respective outlet block 240. The outlet block is shown in more detail in FIGS. 5 and 6. As shown in FIG. 5 an outlet block 240 has an exit aperture within a neck 500. The outlet block 240 can be selectively bolted over the aperture in the valve block body 210 in one of four possible orientations pointing the neck and thus the exit orifice up, down, left or right.

Figure 6:
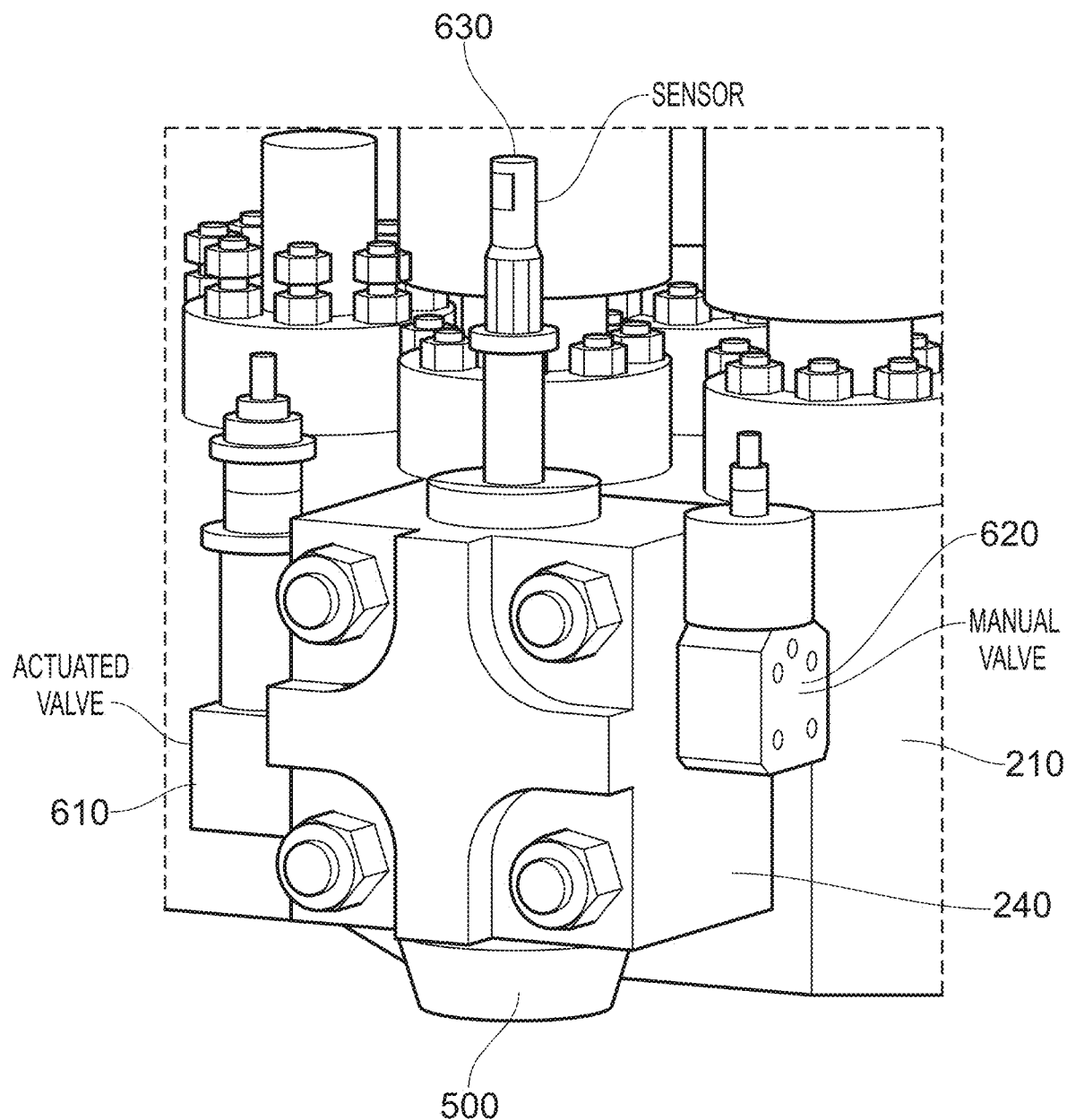
FIG. 6 illustrates a fluid outlet with the addition of optional manual or actuated small bore chemical injection valves and connectors for a pressure and temperature sensor.

FIG. 6 helps illustrate how various valves or sensors may be secured to or be part of the outlet block 240. For example, an actuated valve 610 or manual valve 620 and/or sensor 630 may be secured to the outlet block 240.

Certain embodiments of the present invention thus provide a compact branch block manifold or other such subsea structure which can use a modular approach to customer requirements with pre-engineered manifold branch assemblies that can be grouped together on a set of common headers to meet a specific manifold application. A family group of multi-slot diamond bore blocks of known sizes, pressure ratings and depth ratings can be utilised. These can use a commonality of parts and shared qualification requirements. The rigid valve block body is provided with external headers which can help significantly reduce cost and weight of a manifold.

Flow from a subsea Christmas tree can enter a manifold branch (or slot) block via a suitable manual or actuated isolation valve. The rigid block has a size such that the inlet connection on the block can be flanged/studded/butt welded or connected via an integral hub/clamp connection depending upon project requirements.

Inboard of an inlet valve the flow direction has the option to progress down multiple internal bores depending upon whether the flow path is blocked by an isolation (manual or actuated) valve. Aptly these bores will meet around 120 to 150° relative to an inlet connection. Aptly the bores meet at around 135° relative to an inlet connection. They direct the flow to one of two outlets. Aptly these can be connected to a dual header manifold pipeline system. The outlets merge without flowing from similar back-to-back valve/bore configurations from a second well slot. The merging flows create a diamond bore configuration within the blocks by merging the flows from the well slots in the blocks. This helps reduce the number and complexity of the piping connections made onto the headers. Since the outlets from the blocks are connected directly to headers the outlets provide a further connection point for further pressure and temperature sensors and for chemical injection fluids direct into the headers. This helps simplify header construction when such injection ports are required. Thus, the diamond bore configuration presents an optimal design for use in a dual header manifold or single header manifold with sampling or injection line.

Through using a block construction approach the thermal properties of the blocks can be closely controlled with the option to easily add insulation to slab sides of the blocks. This can be applied for applications when thermal inertia is a critical requirement to the management of the produced fluids during well intervention or an unplanned shut-in event.

A block includes back-to-back well connection slots with each block design including two off well slots. Produced fluid enters the block through a suitable connection outboard of the well isolation valve. The flow path then splits into two-off flow bores arranged at around 135° to the inlet flow path. The produced fluid can then be directed through one of the flow bores through a selection valve to an outlet located on either side of the block. Alternatively, as described hereinafter flow can flow to a central fluid exit/outlet located within the middle of the block for four-slot or six-slot variants. Due to the nature of the back-to-back well slot configuration the bores create a diamond pattern internally within the blocks. The bores meet at the outlet at an angle of 90° or 180° relative to each other. This helps maintain a cross sectional area within the flow paths the outer intercepting bores are counter sunk relative to the face of the blocks.

Mounted to the side of the main (or primary) valve block bodies are side blocks (also referred to as outlet blocks or end blocks) for collecting and directing flow towards headers. These side blocks are held on with four-off sets of studs and nuts. This helps allow the side blocks to be rotated through increments of 90° relative to the main block to direct the flow towards a preferred location within a manifold. This helps simplify a piping arrangement and reduces a number of wells (and thus potential leak paths) required in any interconnecting pipe work.

Figure 7:
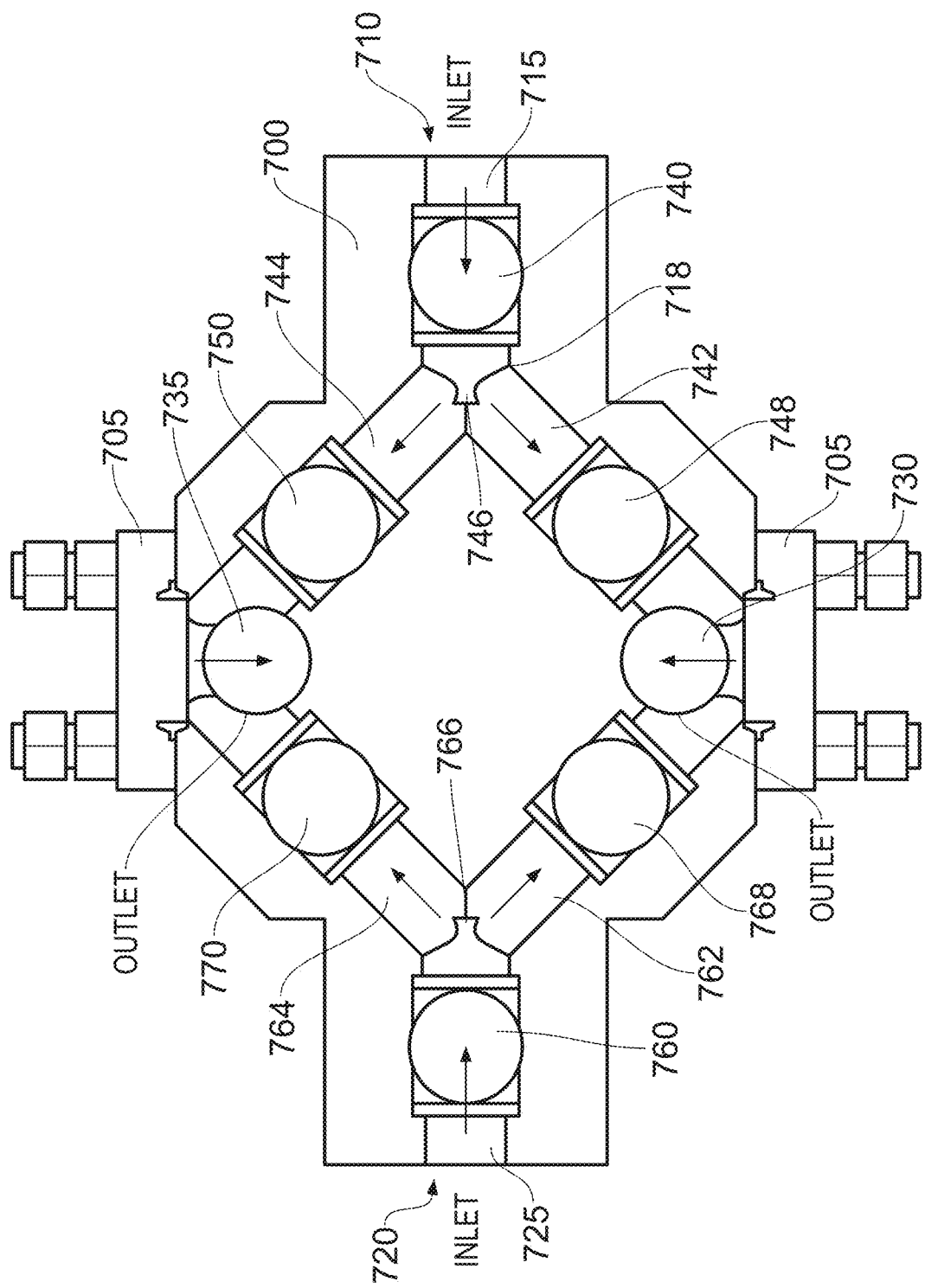
FIG. 7 illustrates a rigid valve block body with two inlets and with end blocks that seal side outlets thus determining a downward direction of fluid flow.

FIG. 7 illustrates a sectional plan view of a two-slot block showing where the outlet bores are intercepted to direct the flow to a bottom of the valve block body 700 and to avoid the use of outlet blocks. This is useful in some situations where the outlet blocks are not required as produced fluid can be directed within the block to an integral outlet below the block. In this situation redundant side penetrations of the block can be blanked off with contoured end blocks 705 or side plates to direct the fluid flow towards the integral outlets.

The two-slot block includes a first fluid inlet 710 and a further fluid inlet 720 at opposed sides of the rigid valve block body 700. A fluid outlet 730 is an opening in a lower surface of the valve block body 700. A further fluid outlet 735 is provided by another opening in the lower surface of the valve block body 700. The first 730 and further 735 fluid outlets are disposed in a spaced apart relationship in the lower surface of the valve block body 700. A first V-shaped fluid communication passageway 718 extends from a straight inlet passageway portion 715 which leads from the first fluid inlet 710 via an isolation valve chamber 740 to the meeting point where two passageway portions of the V-shaped fluid communication passageway join. That is to say the first V-shaped fluid communication passageway 718 is formed from two passageway portions 742, 744 which meet at a first common root region 746. Fluid entering the first fluid inlet 710 passes along the straight passageway portion 715 to the root region 746. A state of a respective flow selection valve in a respective selection valve chamber 748, 750 dictates whether incoming flow of fluid from the inlet flows in one direction or another along a respective passageway portion 742, 744.

The further inlet 720, which is a fluid inlet at an opposed side of the rigid valve block body 700 to the first fluid inlet 710, likewise feeds into a straight fluid communication passageway portion 725 which extends via a isolation valve chamber 760 into a root area from which a first fluid communication passageway portion 762 and a further fluid communication passageway portion 764 extend. Each of those fluid communication passageway portions 762, 764 meet at a common root region 766. A state of a flow isolation valve in the isolation valve chamber 760 determines whether fluid provided at the further inlet 720 flows into the valve block body 700. If fluid flow does flow into the valve block body 700 because the isolation valve is open fluid will flow down one or both fluid communication passageway portions 762, 764. Which path is followed is determined by a state of a respective flow selection valve in a respective flow selection valve chamber 768, 770.

FIG. 7 thus illustrates how the rigid valve block body in the example embodiment includes a first and a further V-shaped fluid communication passageway. In the rigid valve block body shown in FIG. 7 the valve block body has arms which extend away from a central generally square (in plan view) region. An inlet passageway portion extends from an inlet to the root part of the V-shaped fluid communication passageway thus providing a substantially Y-shaped fluid communication passageway. As illustrated in FIG. 7 the two V-shaped passageways are opposed in the sense that the ends of the passageway portions 742, 744, 762, 764 meet close to respective fluid outlets 730, 735. That is to say an end region of each passageway portion of the first V-shaped fluid communication passageway meets an end region of a respective passageway portion of the further V-shaped fluid communication passageway proximate to a respective fluid outlet.

Figure 8:
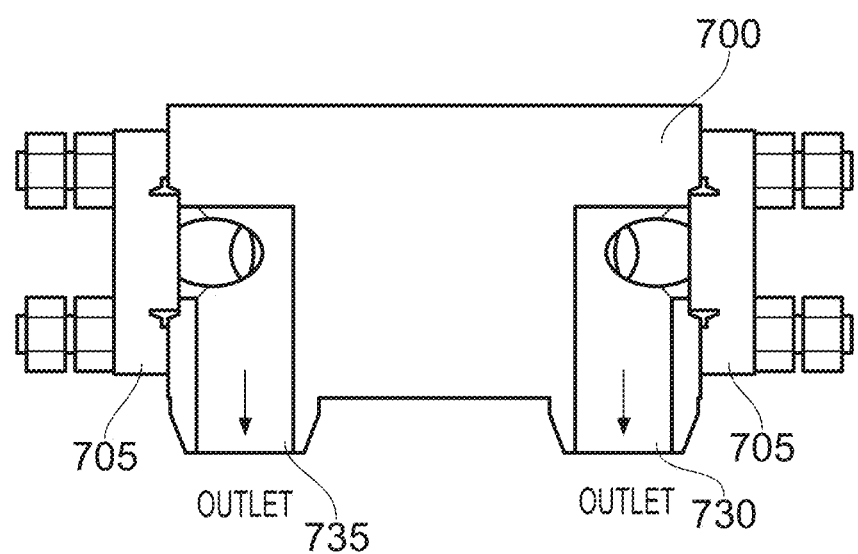
FIG. 8 illustrates the end blocks determining downward flow direction in more detail.

FIG. 8 illustrates an example of a side view through the valve block body 700 shown in FIG. 7 illustrating how end blocks or end plates 705 can blank off fluid outlets otherwise provided in the valve block body 700 and fluid flowing from the passageway portions within the valve block body (not shown) can be directed downwards into fluid outlets 730, 735.

Figure 9:
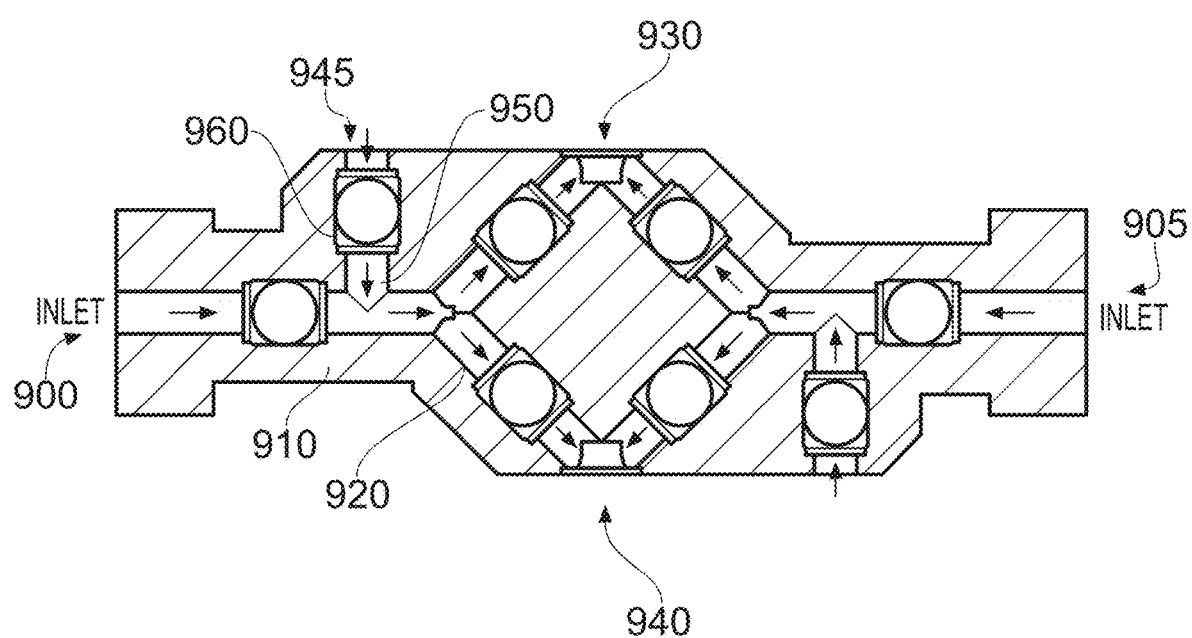
FIG. 9 illustrates a valve block body including two intervention ports which can be fluid inlets and/or fluid outlets.

FIG. 9 illustrates an alternative valve block body provided with optional extra valves and associated bores that provide fluid communicating passageways. As illustrated in FIG. 9 a first and further fluid inlet 900, 905 are formed in an outer surface of a rigid valve block body 910. The valve block body includes a first V-shaped fluid communication passageway 920 which includes two respective passageway portions that merge at a root region leading from a straight inlet passageway portion the ends of the passageway portions of the V-shaped fluid communication passageway 920 extend towards respective fluid outlets 930, 940 on the outer surface of the valve block body. The valve block body 910 likewise includes a further V-shapes fluid communication passageway which extends away from the further fluid inlet 905. An intervention orifice which is an opening/orifice 945 is provided in an outer surface of the valve block body towards the end of the valve body near the first fluid inlet. A fluid passageway portion extends from the opening/orifice 945 to a first intervention port 950 which is an opening formed by an internal bore leading in a straight direction from the opening orifice 945 towards the straight passageway portion leading from the first fluid inlet. Fluid can be allowed to flow along the intervention inlet passageway portion to the intervention port 950 via a respective intervention valve chamber 960. Through this intervention port and passageway and valve arrangement fluid can be inputted or removed (sampled) with fluid flowing in through the first inlet.

FIG. 9 also helps illustrate how a further intervention port arrangement may be provided at a remaining end of the valve block body to allow fluid to be mingled with fluid input via the further inlet or for a sample of the incoming fluid at that fluid inlet to be provided outwards from the valve assembly. A state of respective intervention valves in the two intervention valve chambers is selectable to control whether fluid flows through the opening orifices in the valve body associated with the intervention valves. Thus optional valves and fluid communication passageway portions can be utilised to allow for fluids to be introduced/removed from the well slot fluid flow path. This helps ensure headers are isolated from any introduced or sampled produced fluids. A possible use for this is to include for fluid intervention back into a specific Christmas tree for well stimulation or for taking fluid samples from a specific well for further analysis/investigation before it has mixed with the production streams from other Christmas trees. Applied fluid pressure and/or one way valves can be used to help control whether fluid is sampled or mingled.

Figure 10:
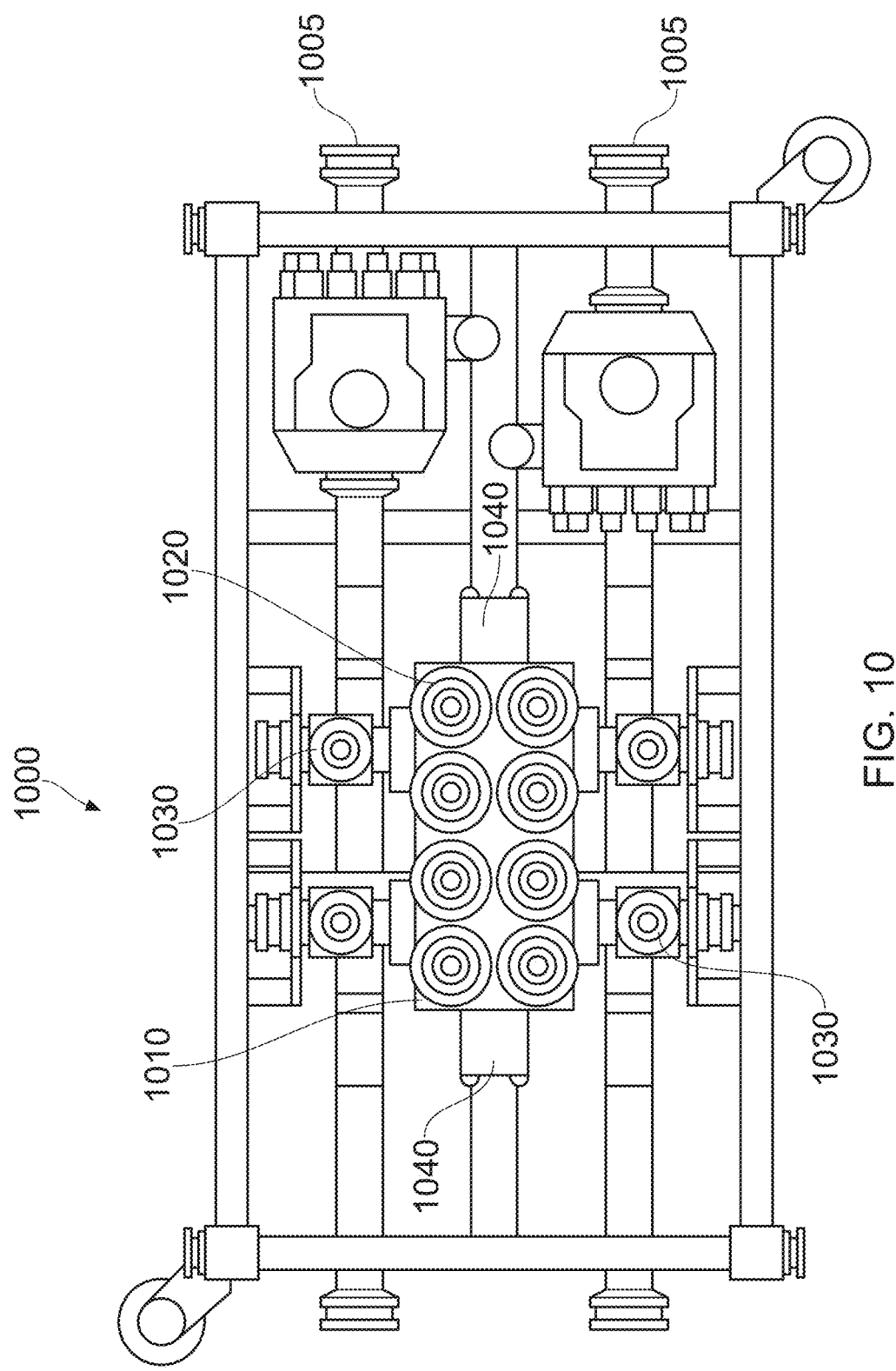
FIG. 10 illustrates a plan view of a manifold including a single four-slot valve block body able to receive four possible inlet flows of fluid.

FIG. 10 illustrates a plan view of an alternative manifold. The manifold 1000 includes a rigid framework that support the two headers 1005 in a spaced apart substantially parallel configuration. In FIG. 10 one rigid valve block body 1010 is utilised. The two headers are external to the valve block body. FIG. 10 illustrates how eight flow selector valves 1020 extend from the upper surface of the valve block body 1010. Four inlet isolation valves 1030 are provided. Each isolation valve and each flow selector valve can be remotely controlled via respective electrical or hydraulic mechanisms to selectively open and close. Each isolation valve can close to prevent fluid from flowing from an inlet fluid flow line connected to a respective fluid inlet.

FIG. 10 also illustrates how the valve block body 1010 includes multiple fluid outlets. Two outlet blocks 1040 are shown in FIG. 10. In addition a further fluid outlet (not shown in FIG. 10) is provided in a lower surface of the valve block body in a central location. This is illustrated more clearly in FIG. 11 and FIG. 12.

Figure 11:
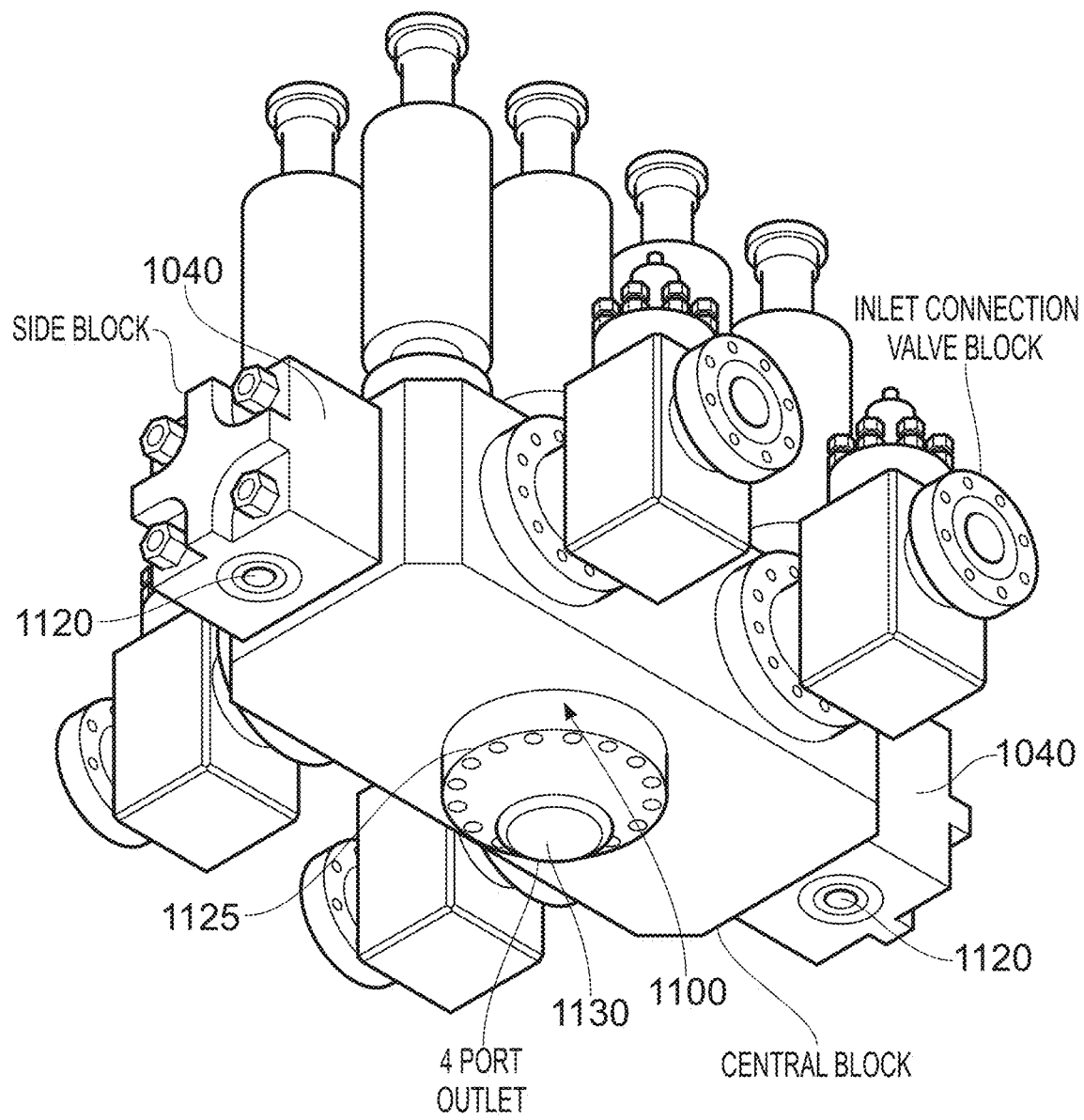
FIG. 11 illustrates a perspective underside view of the valve block body shown in FIG. 10.

FIG. 11 is a perspective underside view of the valve block body 1010 shown in FIG. 10 and illustrates how a further fluid outlet 1100 is provided in a lower surface of the valve block body. FIG. 11 further helps illustrate how the outlet blocks 1040 each have an outlet aperture 1120 which extends through a neck of the outlet block. It is that outlet aperture 1120 which can be orientated by rotating a respective outlet block and fixing it in place to determine how fluid flow flows. Likewise as shown in FIG. 11 an outlet securement 1125 can be secured over a fluid outlet formed by an orifice of the valve block body. The outlet securement 1125 has an outlet orifice 1130 which provides an outlet. Thus four fluid inlets can be selectively connected to three fluid outlets.

Figure 12:
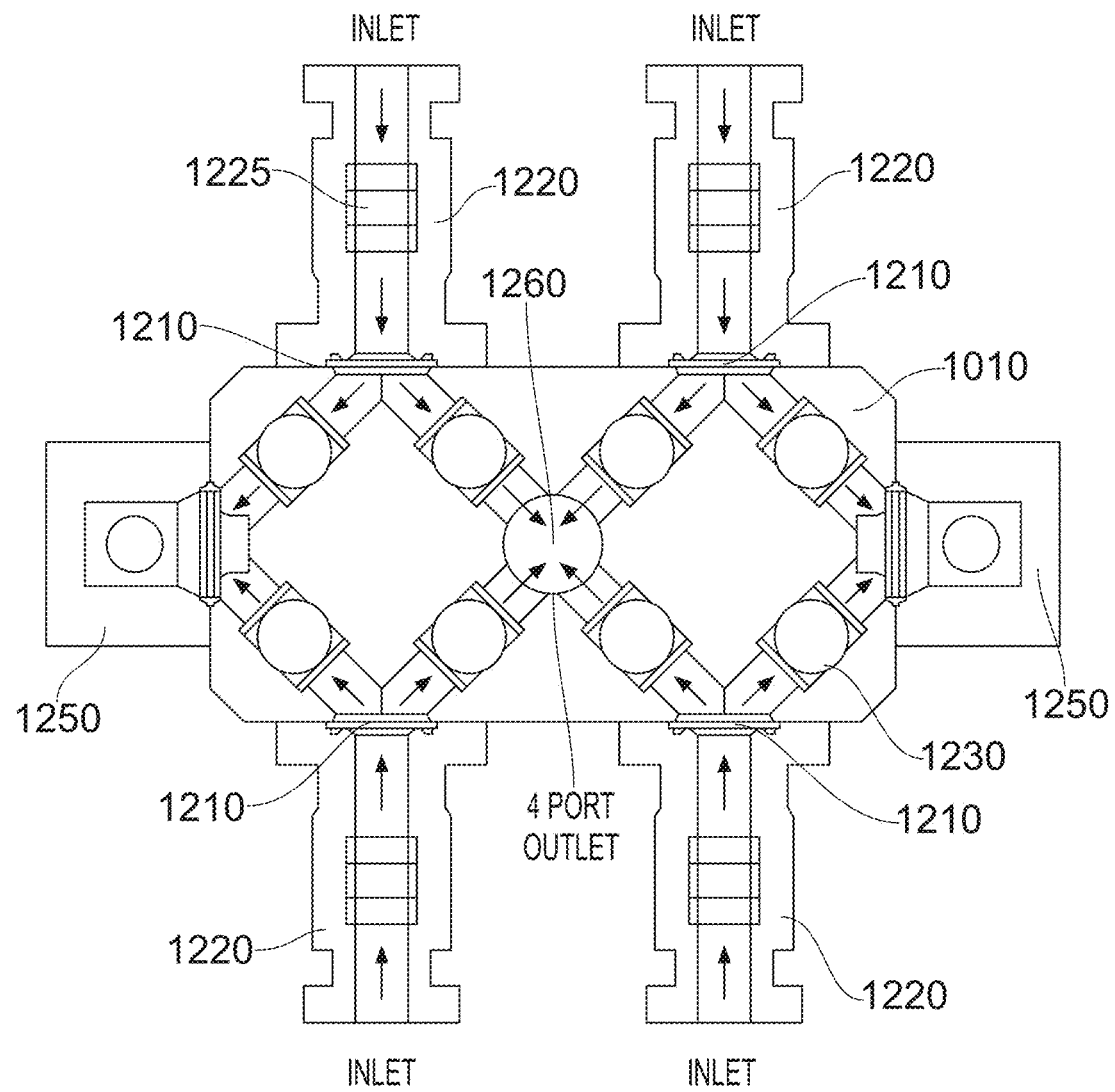
FIG. 12 illustrates fluid communication passageways in a valve block body that includes four fluid inlets.

FIG. 12 helps illustrate the passageway portions through the valve block body 1010 shown in FIG. 10. It is to be noted that unlike the valve block body shown in FIG. 2 the valve block body 1010 of FIG. 12 (and FIGS. 10 and 11) is a relatively rectangular element. Each inlet 1210 is an orifice in the outer surface of the generally rectangular valve block body and each fluid inlet 1220 is a separate block which is secured over the inlet 1210 which carries its own isolation valve 1225. Eight flow selection valves are secured at least partially in respective fluid flow selection chambers 1230 in the passageway portions. Fluid can be made to flow out from one of the side outlets formed by a respective outlet block 1250 or to the central outlet chamber 1260 and through the bottom of the valve block body 1010. Thus the passageway portions comprising four V-shaped fluid communication passageways form two diamond shaped fluid communication passageways which are interlinked so that fluid from various fluid inlet sources can be "steered" to a one or more fluid outlet as desired.

Figure 13:
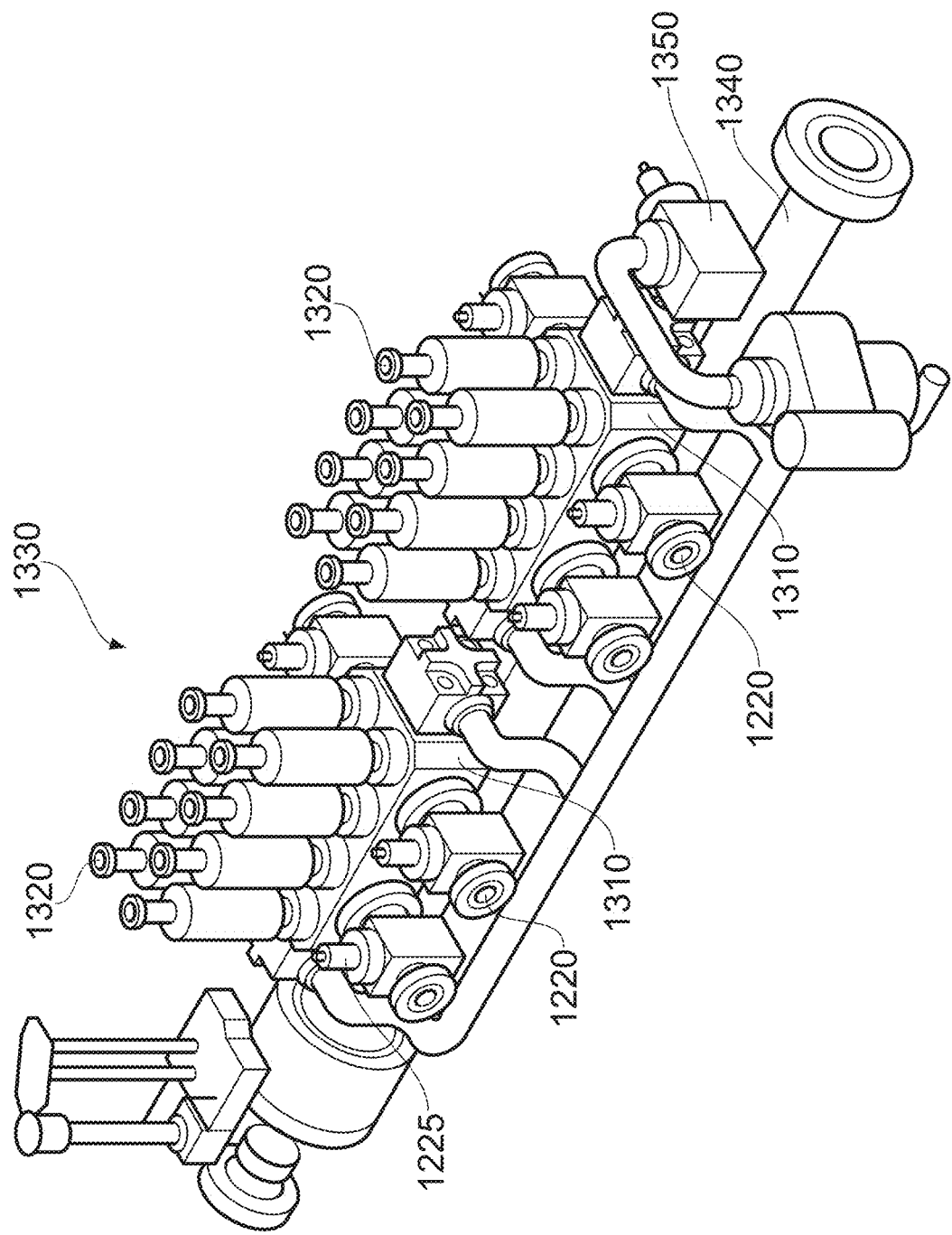
FIG. 13 illustrates a perspective view of a manifold including two four-slot valve block bodies and associated valves.

FIG. 13 illustrates a perspective view of an alternative arrangement in which two four-slot valve block bodies 1310 are provided each with four respective flow selection valves 1320 and four fluid inlets 1220. FIG. 13 thus provides a perspective view of an eight-slot compact branch block manifold 1330 with production header 1340 and multiphase flow meter test line 1350. Manifold headers can optionally be constructed via conventional means using pipe spools welded together with a multiple of tie-in connection T-pieces and elbows.

FIGS. 14, 15, 16 and 17 illustrate an alternative valve block body and spaced apart header arrangement of a manifold utilising a single valve block body able to accommodate three fluid inlets on either side (therefore six fluid inlets in total) and steer incoming fluid to four possible fluid outlets (two fluid outlets in the ends of the valve block and two fluid outlets (shown better in FIGS. 16 and 17) in the lower surface of the valve block body).

Figure 14:
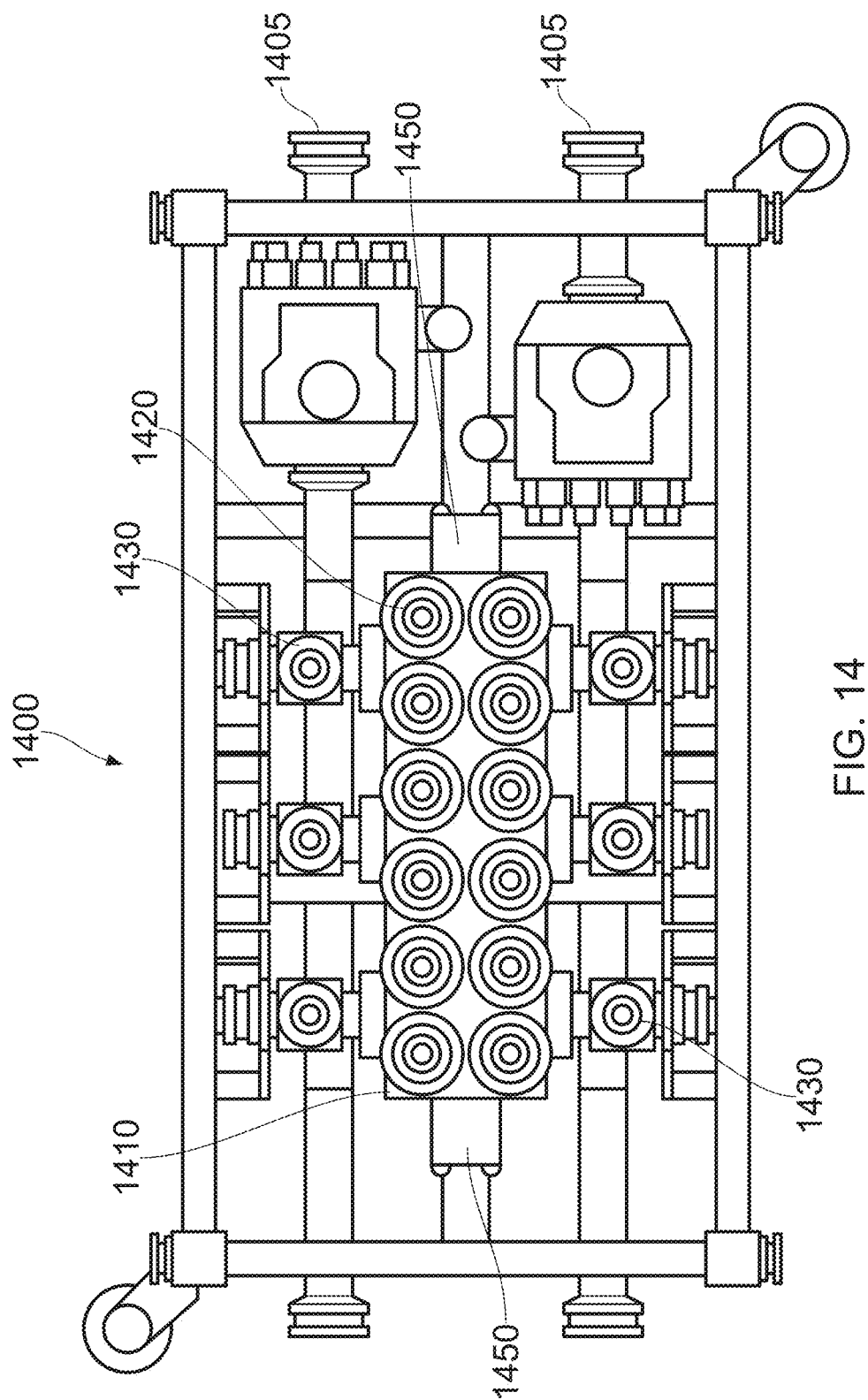
FIG. 14 illustrates a plan view of a manifold including a single valve block body that is a six-slot valve block body able to receive fluid at six fluid inlets.

FIG. 14 illustrates a plan view of a further alternative manifold 1400. The manifold 1400 includes a rigid framework that support the two headers 1405 in a spaced apart substantially parallel configuration. In FIG. 14 one rigid valve block body 1410 is utilised. The two headers are external to the valve block body. FIG. 14 illustrates how twelve flow selector valves 1420 extend from the upper surface of the valve block body 1410. Six inlet isolation valves 1430 are provided. Each isolation valve and each flow selector valve can be remotely controlled via respective electrical or hydraulic mechanisms to selectively open and close. Each isolation valve can close to prevent fluid from flowing from an inlet fluid flow line connected to a respective fluid inlet.

FIG. 14 also illustrates how the valve block body 1410 includes multiple fluid outlets. Two outlet blocks 1450 are shown in FIG. 14. In addition, two further fluid outlets (not shown in FIG. 14) are provided in a lower surface of the valve block body 1410 and spaced apart from each other.

Figure 15:
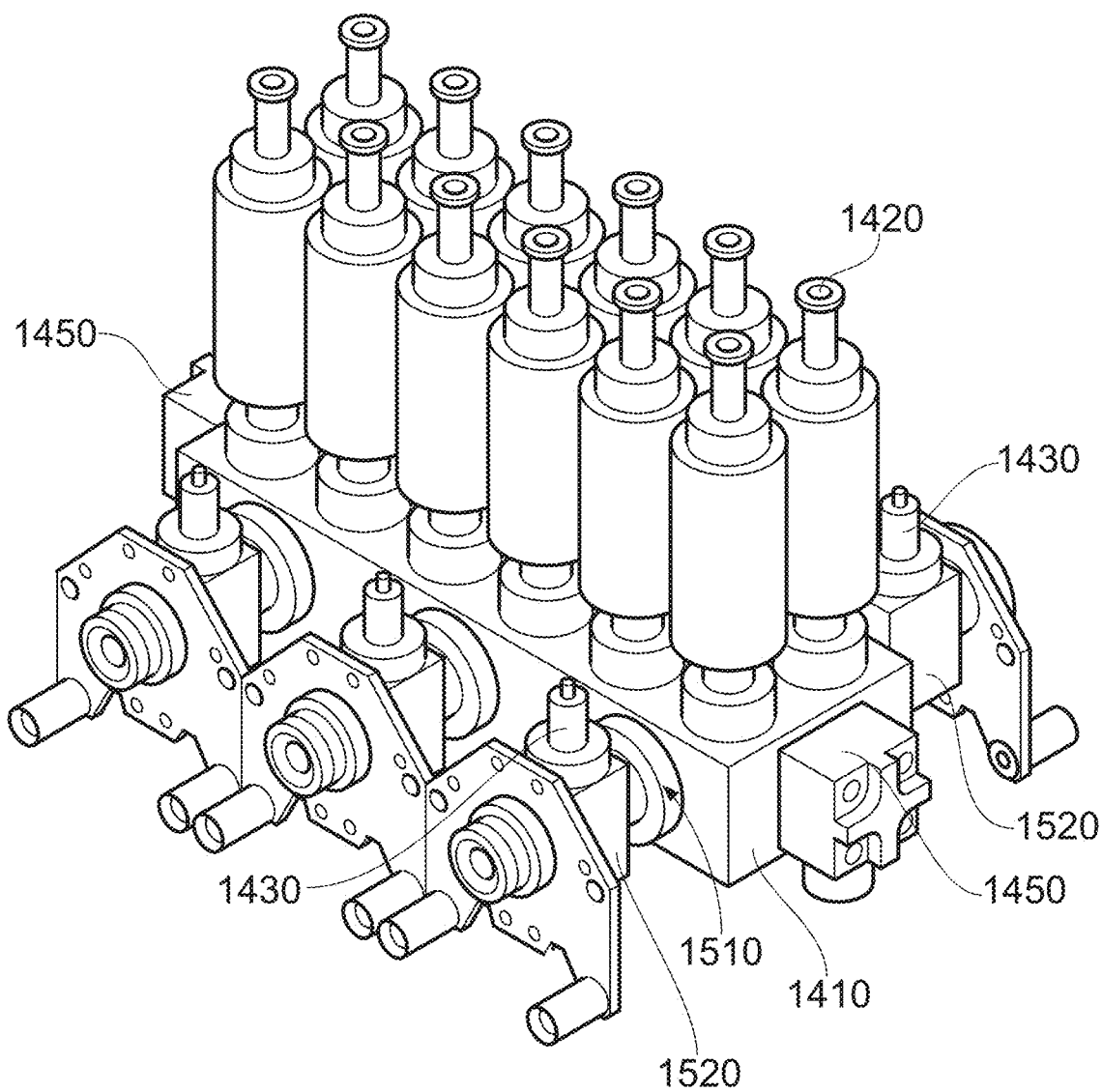
FIG. 15 illustrates a perspective view of the valve block body and valves shown in FIG. 14.

FIG. 15 illustrates a perspective view of rigid valve block body 1410. FIG. 15 also illustrates how the twelve flow selector valves 1420 extend from the upper surface of valve block body 1410. The rigid valve block body 1410 has six inlets 1510. Each inlet 1510 is an orifice in the outer surface of the rectangular valve block body 1410 and each fluid inlet 1520 is a separate block which is secured over the inlet 1510 which carries its own isolation valve 1430. Two outlet blocks 1450 are illustrated in FIG. 15. In addition, two further fluid outlets (not shown in FIG. 14) are provided in a lower surface of the valve block body 1410 and spaced apart from each other.

Figure 16:
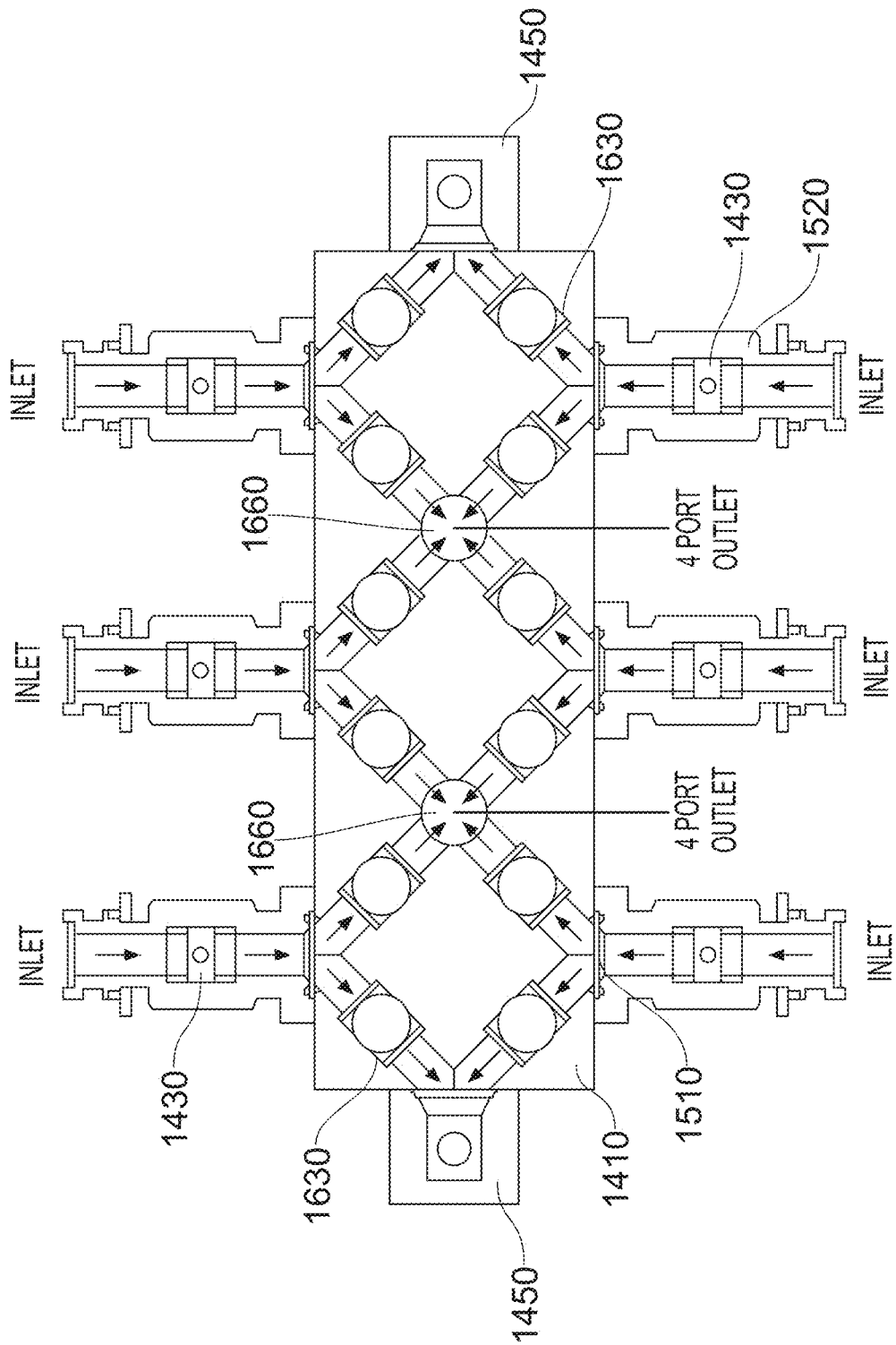
FIG. 16 illustrates fluid communication passageways in a six-slot valve body.

FIG. 16 illustrates the passageway portions through the valve block body 1410 shown in FIGS. 14 and 15. It is to be noted that unlike the valve block body shown in FIG. 2 the valve block body 1410 of FIG. 16 (and FIGS. 14 and 15) is a relatively rectangular element. Each inlet 1510 is an orifice in the outer surface of the generally rectangular valve block body 1410 and each fluid inlet 1520 is a separate block which is secured over the inlet 1510 which carries its own isolation valve 1430. Twelve flow selection valves are secured at least partially in respective fluid flow selection chambers 1630 in the passageway portions. Fluid can be made to flow out from one of the side outlets formed by a respective outlet block 1450 or to outlet chambers 1660 and through the bottom of the valve block body 1410. Thus the passageway portions comprising six V-shaped fluid communication passageways form three diamond shaped fluid communication passageways which are interlinked so that fluid from various fluid inlet sources can be "steered" to a one or more fluid outlet as desired.

Figure 17:
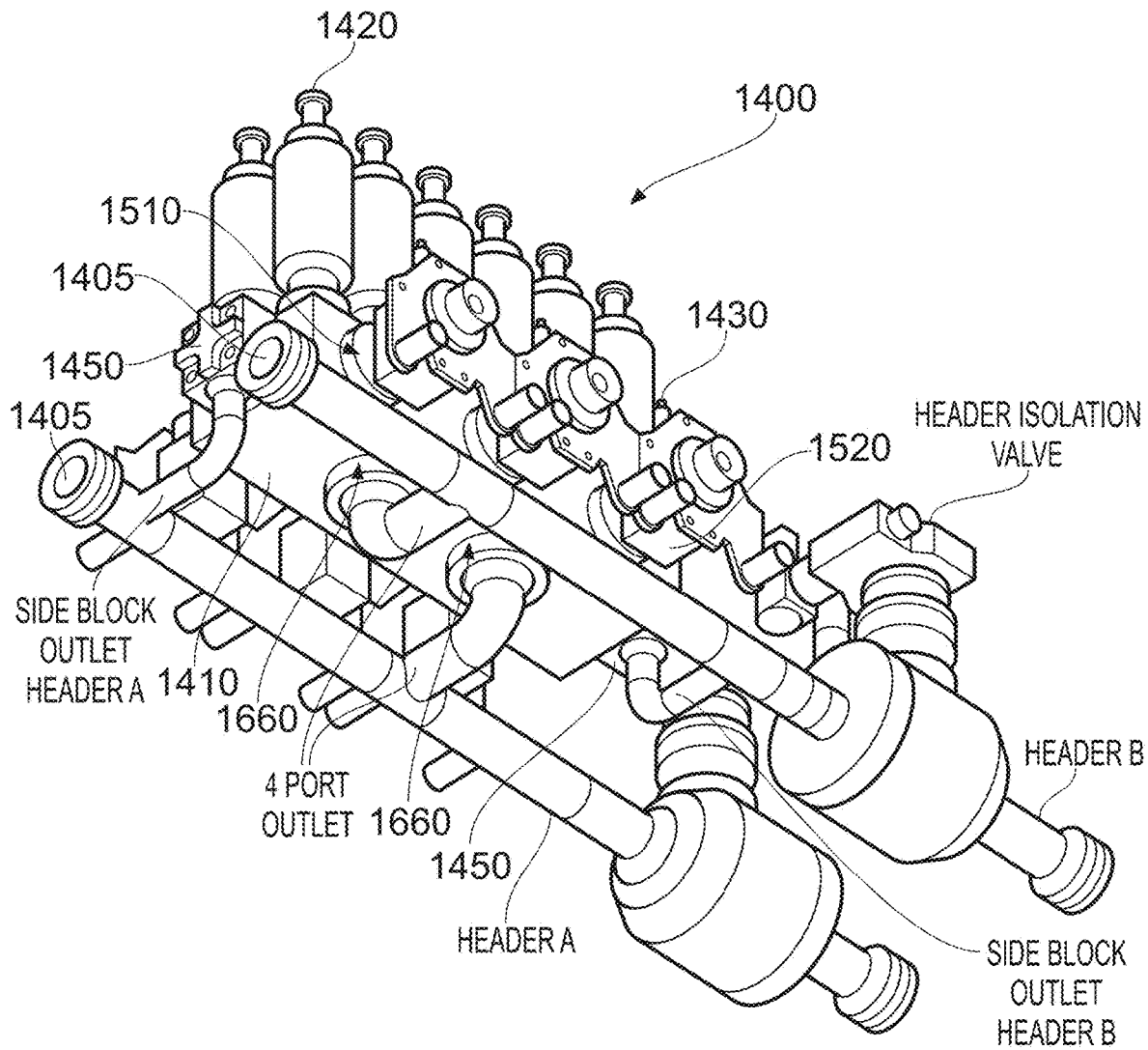
FIG. 17 shows an underside perspective view of the valve block body and two spaced apart external headers shown in FIGS. 15 and 16.

FIG. 17 is a perspective underside view of the further alternative manifold 1400 illustrated in FIG. 14. The rigid valve block body 1410 is shown in connection with two header pipes 1405 that are in a spaced apart substantially parallel configuration. FIG. 17 also illustrates how twelve flow selector valves 1420 extend from the upper surface of the valve block body 1410. The rigid valve block body 1410 has six inlets 1510. Each inlet 1510 is an orifice in the outer surface of the rectangular valve block body 1410 and each fluid inlet 1520 is a separate block which is secured over the inlet 1510 which carries its own isolation valve 1430. Two outlet blocks 1450 are illustrated in FIG. 17. In addition, two further fluid outlets 1660 are provided in a lower surface of the valve block body 1410 and spaced apart from each other.

According to certain embodiments of the present invention valve blocks can be sized/optimised for a specific valve bore size and pressure rating. As a result a family group of block configurations can be developed to meet a range of subsea Christmas tree sizes and pressure ratings. Valves within any block can be suitably placed so as to not only account for a change of actuation method but also for any impact of water depth on actuator size requirements.

Certain embodiments of the present invention provide better thermal performance, thereby reducing insulation requirements. Through using a block construction approach the thermal properties of the blocks can be closely controlled with an option to easily add insulation to slab sides of the blocks. This can be achieved for applications when thermal inertia is an important requirement for the management of the produced fluids during well intervention or an unplanned shut-in event.

Since produced fluid flows are merged at block outlets a number of connections required onto headers is immediately reduced resulting in a simplified pipework with minimised welding and non-destructive examination requirements. This inherent reduction of field weld connections automatically helps simplify a manifold assembly and testing process and requirements. This potentially speeds up assembly and testing processes and reduces a need for complicated fabrication jigs.

Through using blocks of known size and dimensions with pre-defined interface locations a manifold structure can be modularised with dedicated structural interfaces to blocks (namely, for guide supports or anchor supports) and to integrated ROV panels. This helps speed up a project design process with reduced risk of omissions/errors in a complete manifold assembly.

Where appropriate, according to certain embodiments of the present invention blocks can be machined to provide an integral mini-manifold for any sea-chest compensation circuits required for actuators and to provide anchoring points for associated small-bore piping. As a result the blocks can also help simplify the small-bore piping required upon a manifold system.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herewith unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A valve block body for determining fluid flow direction at a subsea structure, comprising:
    a first fluid inlet and a further fluid inlet at opposed sides of the valve block body; wherein the valve block body is rigid and unitary;
    a first fluid outlet of the valve block body and a further fluid outlet of the valve block body disposed in a spaced apart relationship;
    a first V-shaped fluid communication passageway that comprises two passageway portions each extending within the valve block body from a first common root region proximate to the first fluid inlet;
    a further V-shaped fluid communication passageway that comprises two further passageway portions each extending within the valve block body away from a further common root region proximate to the further fluid port; and
    a respective selection valve chamber, in a fluid flow path in each passageway portion, for a respective flow selection valve;
    wherein an end region of each passageway portion of the first V-shaped fluid communication passageway meets an end region of a respective passageway portion of the further V-shaped fluid communication passageway proximate to a respective fluid outlet.

2. The valve block body as claimed in claim 1, further comprising:
    a still further fluid outlet in a base region of the valve block body.

3. The valve block body as claimed in claim 1, further comprising:
    the valve block body comprises at least one arm region, that each extend from a side of the valve block body, and that comprises an inlet passageway portion that extends through the arm region from an opening orifice on the respective side.

4. The valve block body as claimed in claim 3, further comprising:
    a respective isolation valve chamber, in a fluid flow path in each inlet passageway portion in each arm region, for a respective well isolation valve.

5. The valve block body as claimed in claim 3, further comprising:
    a first intervention port and a further intervention port each extending from a respective opening orifice in an outer surface of the valve block body to a respective inlet passageway portion of a respective arm region via an intervention valve chamber, for a respective intervention valve.

6. The valve block body as claimed in claim 1, further comprising:
    the valve block body comprises at least one opening orifice on each respective side of the valve block body, each opening orifice comprising a respective fluid inlet of the valve block body, and a plurality of securing elements on the side around the opening orifice for securing to a respective inlet connection block that comprises an inlet passageway portion.

7. The valve block body as claimed in claim 6, further comprising:
a respective isolation valve chamber, in a fluid flow path in each inlet passageway portion in each inlet connection block, for a respective well isolation valve.

8. The valve block body as claimed in claim 1, further comprising:
the end regions of each passageway portion meet and open into corresponding end regions of other passageway portions at an exit chamber region in the valve block body and each exit chamber region is proximate to a respective fluid outlet.

9. The valve block body as claimed in claim 1, further comprising:
the valve block body comprises two fluid inlets and two fluid outlets.

10. The valve block body as claimed in claim 1, further comprising:
the valve block body comprises four fluid inlets and three fluid outlets including one outlet disposed in a centre region of a base of the valve block body.

11. The valve block body as claimed in claim 1, further comprising:
the valve block body comprises six fluid inlets and four fluid outlets including two fluid outlets disposed at respective off-centre locations in a base region of the valve block body.

12. The valve block body as claimed in claim 1 wherein the valve block body is a forged metallic body and any bend in each flow path through the body is more than 120.degree. and less than 170.degree. inclined with respect to an incoming fluid flow path axis.

13. A subsea structure for connecting a plurality of inlet fluid flow lines to at least one outlet fluid flow line, comprising:
the valve block body as claimed in claim 1;
a plurality of flow selection valves each at least partially located in a respective selection valve chamber of the valve block body; and
a plurality of well isolation valves each at least partially in a respective isolation chamber of the valve block body.

14. The subsea structure as claimed in claim 13, further comprising:
a plurality of inlet connection blocks secured over respective fluid inlets of the valve block body, each comprising a respective isolation valve chamber, and an isolation valve at least partially in an isolation valve chamber.

15. The subsea structure as claimed in claim 13 wherein the subsea structure is a subsea manifold.

16. The subsea structure as claimed in claim 13, further comprising:
a plurality of headers external to the valve block body and in selective fluid communication with the first and further fluid outlets.

17. A method for determining fluid flow direction at a subsea structure, comprising the steps of:
providing an incoming flow of fluid to at least one fluid inlet of a plurality of fluid inlets of a unitary valve block body; and
selecting a state of an isolation valve in a flow path of each of two respective passageway portions of at least one V-shaped fluid communication passageway of at least two V-shaped fluid communication passageways in the valve block body;
thereby directing the incoming flow of fluid from the at least one fluid inlet to a selected one of at least two fluid outlets of the valve block body.

18. The method as claimed in claim 17, further comprising:
simultaneously providing an incoming flow of fluid at a plurality of the fluid inlets; and
via a selected state of the isolation valves in the V-shaped fluid communication passageways, routing the incoming flow along a plurality of passageway portions to a common outlet thereby mingling fluid from a plurality of sources or to separate fluid outlets thereby keeping fluid from a plurality of sources separate as the fluid flows through the valve block body.

19. The method as claimed in claim 17, further comprising:
providing fluid to a plurality of headers that are external to the valve block body by routing fluid from flow lines to the headers via at least one valve block body.

* * * * *